May 10, 1949.     H. D. STECHER ET AL     2,469,851
TUBE COUPLING
Filed Jan. 18, 1946

INVENTORS
HENRY D. STECHER
& ELMER F. JACKMAN, Dec'd
BY HELEN E JACKMAN, Admx.
BY Richey & Watts
ATTORNEYS Patented May 10, 1949

2,469,851

UNITED STATES PATENT OFFICE 2,469,851

TUBE COUPLING

Henry D. Stecher, Lakewood, Ohio, and Elmer F. Jackman, deceased, late of Lakewood, Ohio, by Helen E. Jackman, administratrix, Lansing, Mich.; said Stecher assignor to The Weatherhead Company, Cleveland, Ohio, a corporation of Ohio Application January 18, 1946, Serial No. 642,018

3 Claims. (Cl. 285—167)

Our invention relates to tube couplings and connectors.

An object of our invention is to provide an improved method and device for coupling smooth surfaced tubes.

Another object of our invention is to make both a mechanical connection and a leak-proof seal with a smooth surfaced tube.

A further object of our invention is to provide for joining mechanically and sealing smooth surfaced tubes without special tools.

A further object is to provide a joint in which fluid pressure assists in making the joint leak-tight.

Other and further objects, features and advantages of the invention will become apparent as the description proceeds.

In carrying out the invention in accordance with a preferred form thereof, a fitting or body with an O-ring type of seal is employed for producing a leak proof joint, a tube nut with means for mechanically engaging the tube is employed for securing the tube mechanically in the body and a relatively stiff ring disposed in the O-ring seal is employed for preventing extrusion of the relatively soft O-ring or gasket through the clearance between the body and the tube joined thereto.

A better understanding of the invention will be afforded by the following detailed description considered in conjunction with the accompanying drawing, in which Fig. 1 is a view partially in longitudinal medial section of a tube coupling forming an embodiment of my invention;

Like reference characters are utilized throughout the drawing to designate like parts.

Figure 1:
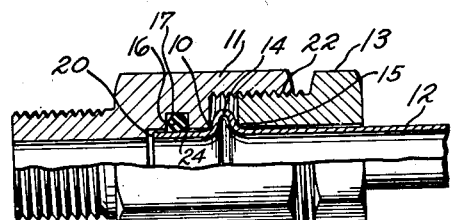
Figure 2:
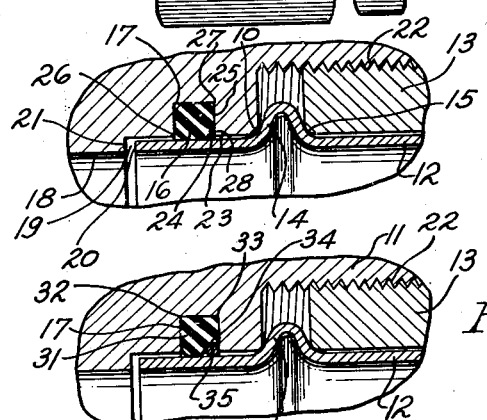
Fig. 2 is an enlarged fragmentary sectional view of a portion of the apparatus of Fig. 1.

Referring to Figs. 1 and 2, the arrangement there shown by way of illustration, comprises a tube-receiving body 11 for receiving an unthreaded tube 12 and a tube nut 13 for securing the tube 12 in the body 11. For enabling the tube 12 to be made mechanically secure in the body 11 and readily detachable, the tube 12 is flared to form an annular rib 14 spaced from the end of the tube and adapted to be clamped between the edge 10 of the body 11 and the forward edge 15 of the tube nut 13.

In order to provide a leak-proof seal between the tube 12 and the body 11 which may be made readily and which will not be damaged by the detachability of the tube 12, an O-ring type of seal is preferably provided comprising a ring 16 of resilient rubber-like material occupying an annular groove 17 in the body 11.

There is a bore 18 in the body 11 serving as a continuation of the passageway formed by the interior of the tube 12. Preferably, the body 11 is counter bored as indicated at 19 leaving a shoulder 21 whereby the end 20 of the tube 12 may be received in the counter bore 19 and may abut the shoulder 21. In the arrangement illustrated, the body 11 has an internally threaded mouth 22 adapted to receive the tube-securing tube nut 13, but it will be understood that the invention is not limited to the precise arrangement shown for securing the tube-nut 13 or tube-fastening device in the body 11, or for drawing the tube 12 into the body 11 against the shoulder 21 or against the edge 10 in the mouth of the body 11.

For ready insertion and detachability of the tube 12 in the counter bore 19 of the body 11, the dimensions are preferably such that a slight clearance 23 is provided between the outer surface of the tube 12 and the inner surface of the counter bore 19. In order to prevent the pressure within the bore 18 and within the tube 12 from forcing the relatively soft material of the gasket or sealing ring 16 into the clearance space 23, injuring the gasket and interfering with ready detachability of the tube 12, a guard is preferably provided such as a ring 24. The latter is composed of metal or other relatively stiff material such as a suitable plastic, for example, having a cross-sectional diameter greater than the depth of the clearance space 23.

As illustrated in Figs. 1 and 2 the annular groove 17 has a substantially rectangular cross-section and the uncompressed cross-sectional shape of the sealing ring 16 is substantially circular so that space remains between the sealing ring 16 and the outer side wall 25 of the annular groove 17 for the guard ring or extrusion-preventing ring 24.

It will be understood that when the coupling is under pressure, the sealing ring 16 will tend to be deformed from circular cross-section and preferably the uncompressed diameter of the sealing ring 16 is somewhat greater than the depth radially of the annular groove 17, so that the insertion of the tube 12 in the counter bore 19 will also tend to distort the cross-sectional shape of the sealing ring 16. When the coupling is under pressure, there will be a tendency for the sealing ring 16 to assume the shape shown in Fig. 2 in which the material tends to be forced away from the corner 26 of the annular groove 25 and into the two corners 27 and 28 nearest the throat 10 of the body 11. The presence of the guard ring 24, however, prevents the extrusion of the material from the corner 28 into the clearance space 23. It will be understood that the ring 24 is preferably of such a diameter as to make a relatively close fit around the outer surface of the tube 12.

Figure 3:
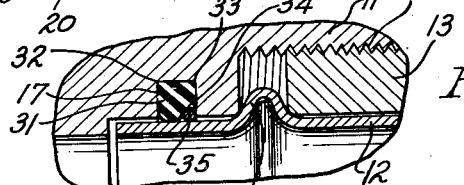
Fig. 3 is a fragmentary sectional view corresponding to Fig. 2, illustrating the use of a sealing ring nearly filling the groove therefor and having a recess in which an extrusion preventing ring is located.

As illustrated in Figs. 1 and 2 we have shown a sealing ring having a normal or undistorted cross-sectional shape which is approximately circular or it may be elliptical, but it will be understood that our invention is not limited to the precise arrangement illustrated. For example, if desired the sealing ring may have such a shape as to fill the annular groove 17 substantially except for the space occupied by the guard ring. As illustrated in Fig. 3, a relatively rectangular cross-sectional sealing groove 17 may be provided having a gasket or sealing ring 31 of such shape that its cross section has substantially square outer corners 32 and 33 filling these corners of the groove 17. An annular recess 34 is provided for receiving a guard ring or extrusion-preventing ring 35, which in this case may be of a somewhat larger diameter than the corresponding extrusion-preventing ring 24 illustrated in Figs. 1 and 2.

Figure 4:
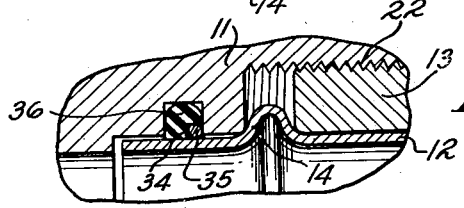
Fig. 4 is a fragmentary sectional view corresponding to Fig. 3 in which the sealing ring has a substantially circular cross-section with a quadrant removed to accommodate the extrusion-preventing ring.

Although in connection with the arrangement of Fig. 3, we have illustrated a sealing ring 31 having square corners with a recess 34 to accommodate a relatively large diameter guard ring 35, it will be understood that our invention is not limited to the use of a sealing ring of the precise cross-sectional shape shown when it is desired to employ a relatively large diameter sealing ring. Thus as illustrated in Fig. 4, a sealing ring 36 may be employed having an undeformed cross sectional shape which is substantially circular with a recess 34 provided in the form of a quadrant or a sector of the normal circular outline of the cross section of the sealing ring 36 to receive the guard ring or extrusion-preventing ring 35.

Figure 5:
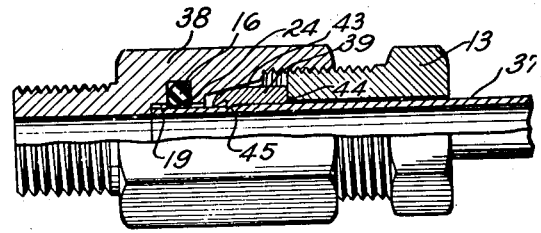
Fig. 5 is a view partially in longitudinal medial cross-section of a tube-coupling employing a cutting ring for mechanically securing the tube in the fitting.
Figure 7:
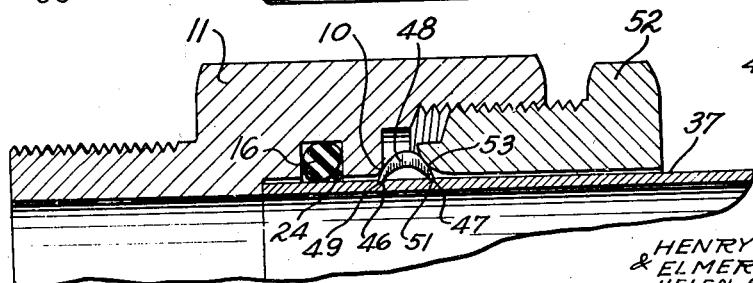
Fig. 7 is a fragmentary sectional view corresponding to Fig. 5 illustrating a cutting ring of a different type.

In the arrangement of Figs. 1 to 4, inclusive, the smooth surfaced or unthreaded tubing 12 is specially prepared for securement in the body 11 in that a portion of the tube 12 is flared to form the rib 14. However, our invention is not limited to the use of specially prepared tubing in order to obtain both mechanical securement and leak-proof sealing of tubing in a tube-receiving body. Thus, for example, as illustrated in Figs. 5 and 7, a smooth entirely cylindrical tube 37 may be received within a body or fitting 38 and provided, both with mechanical securement and leak-proof sealing. As shown specifically in Fig. 5 the body 38 may be provided with a counter bore 19 for receiving the entirely cylindrical smooth surfaced tubing 37 with an O-ring sealing arrangement such as illustrated in Fig. 1 and an extrusion-preventing guard ring 24. In this case, a cutting ring 39 is provided for securing the tubing 37 in the counter bore 19.

The invention is not limited to the use of a specific type of cutting ring, but the ring 39 has for sake of illustration been shown as being of the type having a re-entrant counter bore 41 with a sharpened inner forward cutting edge 42.

For receiving the cutting ring 39 and causing the sharpened edge 42 thereof to cut into the outer surface of the tube 37, a tapered or flaring mouth 43 is provided in the tube-receiving body 38, such that as the tube nut 13 is drawn into the body 38, the forward edge 44 thereof bears against the cutting ring 43 forcing it inward and causing the forward edges thereof to contract whereby the sharpened edge 42 is forced inward or is forced to contract, cutting into the surface 37 and seating itself therein to produce a notch 45 preventing internal pressure from pulling the tube 37 out of the counter bore 19 in the body 38.

Figure 6:
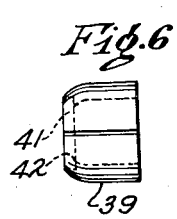
Fig. 6 is a side view of the cutting ring shown in Fig. 5.
Figure 8:
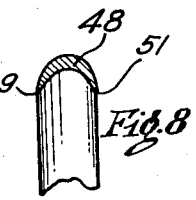
Fig. 8 is a detail view of the cutting ring shown in Fig. 7.

It will be understood that our invention is not limited to the use of the specific type of cutting ring 39 illustrated in Figs. 5 and 6. For example, if desired, a cutting ring may be employed which bites into the tubing 37 at both the forward and rearward ends of the cutting ring or cutting sleeve as illustrated by the notches 46 and 47 in the tube 37 shown in Fig. 7. In this case, a cutting ring 48 may be employed having a cross-sectional shape such as illustrated in Fig. 8 with a sharpened forward edge 49 and a sharpened rearward edge 51. For this type of cutting ring it is unnecessary to provide the body 11 with a mouth having a long flare, and the rounding of the edge 10 is sufficient to cause the forward edge 49 of the ring 48 to bite into the tubing 37. For causing the rear edge 51 of the ring 48 to bite into the tubing 37, a tube nut 52 may be provided having an inner forward edge 53 rounded as shown whereby axial movement of the nut 52 forces the edge 51 inward.

We have herein shown and particularly described certain embodiments of our invention and certain methods of operation embraced therein for the purpose of explaining its principle of operation and showing its application, but it will be obvious to those skilled in the art that many modifications and variations are possible and we aim, therefore, to cover all such modifications and variations as fall within the scope of our invention which is defined in the appended claims.

What is claimed is:

1. In combination a body having a bore therein, a tube received within said bore, an annular groove with a cylindrical outer wall in said body around the portion of said bore receiving said tube with an O-ring seal in said groove and a relatively stiff ring within said groove between said sealing ring and the side wall of said groove away from the interior of said body for protecting said sealing ring against extrusion through the clearance between the bore of said body and the outer surface of said tube.

2. A tube coupling comprising a body having a fluid conducting passageway including a generally cylindrical bore leading from one end thereof for reception of the end of a tube, an internal groove in said body at said bore, a shoulder formed in said body axially outwardly of said groove, a tube having its end snugly received in said bore, clamp means associated with said body for tightening said coupling, relatively rigid tube retaining means carried by said tube and clamped between said body shoulder and clamp means to mechanically retain said tube in the coupling against axial motion, and a rubber-like O-ring seal in said body groove, said seal engaging the bottom wall of said groove, the tube, and the side wall of said tube disposed toward said one end of the body, there being clearance between said ring body and tube at the corner formed by said groove side wall and tube, fluid pressure within said coupling urging said ring away from the other side wall of said groove and into contact with said tube and said one groove side wall to provide a fluid seal between said body and tube.

3. A tube coupling comprising a body having a fluid conducting passageway including a generally cylindrical bore leading from one end thereof for reception of the end of a tube, an internal groove in said body at said bore, a shoulder formed in said body axially outwardly of said groove, a tube having its end snugly received in said bore, clamp means associated with said body for tightening said coupling, relatively rigid tube retaining means carried by said tube and clamped between said body shoulder and clamp means to mechanically retain said tube in the coupling against axial motion, a rubber-like O-ring seal in said body groove, said ring engaging the bottom wall of said groove, the tube, and the side wall of said tube disposed toward said one end of the body, there being clearance between said ring body and tube at the corner formed by said groove side wall and tube, fluid pressure within said coupling urging said ring away from the other side wall of said groove and into contact with said tube and said other groove side wall to provide a fluid seal between said body and tube, and a relatively rigid and continuous extrusion prevention ring disposed in said corner and pressed against said body and tube by fluid pressure to block the clearance between the body and tube.

HENRY D. STECHER.
HELEN E. JACKMAN,
Administratrix of the Estate of Elmer F. Jackman, Deceased.

REFERENCES CITED

The following references are of record in the file of this patent:

UNITED STATES PATENTS

| Number | Name | Date |
|---|---|---|
| 1,063,926 | Schuermann | June 3, 1913 |
| 1,872,863 | Wood | Aug. 23, 1932 |
| 1,984,806 | Pfefferle | Dec. 18, 1934 |
| 2,115,383 | Christensen | Apr. 26, 1938 |
| 2,182,811 | Kocher | Dec. 12, 1939 |
| 2,226,826 | Miller | Dec. 31, 1940 |
| 2,393,252 | Kauping | Jan. 22, 1946 |

FOREIGN PATENTS

| Number | Country | Date |
|---|---|---|
| 453,217 | Great Britain | Dec. 1, 1934 |
| 409,692 | Great Britain | May 2, 1934 |